United States Patent [19]

Kirchner et al.

[11] 4,370,306

[45] Jan. 25, 1983

[54] PROCESS FOR SEPARATION OF TRACES OF GASEOUS CONTAMINANTS FROM WASTE GASES BY CHEMICAL ABSORPTION

[75] Inventors: Kurt Kirchner, Eschborn; Wolfgang Litzenburger, Herrstein, both of Fed. Rep. of Germany

[73] Assignee: Dechema Deutsche Gesellschaft fur Chemisches Apparatewesen E V, Frankfurt am Main, Fed. Rep. of Germany

[21] Appl. No.: 136,024

[22] Filed: Mar. 31, 1980

[30] Foreign Application Priority Data

Apr. 3, 1979 [DE] Fed. Rep. of Germany ....... 2913329

[51] Int. Cl.$^3$ ..................... B01D 53/34; B01D 57/00
[52] U.S. Cl. ................................... 423/220; 423/224; 423/240; 423/241; 423/245; 423/242; 423/491; 423/493; 423/561 R; 210/760; 204/130
[58] Field of Search ............... 423/220, 224, 234, 240, 423/244, 242 R, 488, 561 R, 544, 245; 55/68, 71, 73; 204/130; 210/760

[56] References Cited

U.S. PATENT DOCUMENTS

| 1,597,964 | 8/1926 | Gluud | 423/220 |
| 2,378,689 | 6/1945 | Collins | 423/234 |
| 2,430,982 | 11/1947 | Hoover | 55/73 |
| 2,624,694 | 1/1953 | Sailors | 423/220 |
| 3,852,407 | 12/1974 | Schmitt et al. | 423/240 |
| 4,256,710 | 3/1981 | Azuma et al. | 423/224 |

FOREIGN PATENT DOCUMENTS

| 2335520 | 1/1974 | Fed. Rep. of Germany | 210/760 |
| 2816979 | 10/1979 | Fed. Rep. of Germany | 5/73 |
| 52-68072 | 6/1977 | Japan | 55/68 |
| 52-68073 | 6/1977 | Japan | 55/68 |
| 592430 | 2/1978 | U.S.S.R. | 423/240 |

OTHER PUBLICATIONS

Biltz-Klemm-Fischer, "Experimentelle Eintohrung indie Anorganische Chemie", Walter de Gruyen & Co., Berlin, 1971, pp. 111-115.
Ryland et al, "Thiols", The Analytical Chemistry of Sulfur and its Compounds, Part I, 1970, pp. 465-519, Wiley-Interscience, New York.
Moore et al., "A Spectrographic Method for the Determination of Mercaptans in Air", Industrial Hygene Journal, Dec. 1960, pp. 466-470.

*Primary Examiner*—Earl C. Thomas
*Attorney, Agent, or Firm*—Sprung, Horn, Kramer & Woods

[57] ABSTRACT

In the separation of traces of halogens and sulfur from a halogen- and/or sulfur-containing gas stream wherein the gas stream is contacted with a wash liquid to absorb the halogens and sulfur, the improvement which comprises including in the wash liquid heavy metal ions capable of forming difficultly soluble halides and sulfides. Preferably the heavy metal ions are silver or copper, and the insoluble heavy metal sulfide and/or halide is removed from the wash liquid which is recirculated. Almost quantitative removal is achieved in as little as 1 second of gas-wash liquid contact.

17 Claims, No Drawings

PROCESS FOR SEPARATION OF TRACES OF GASEOUS CONTAMINANTS FROM WASTE GASES BY CHEMICAL ABSORPTION

BACKGROUND OF THE INVENTION

The invention relates to a process for the separation of traces of gaseous contaminants, or pollutants, based on halogens and/or sulfur and/or their compounds from waste gases by chemical absorption.

Waste gases resulting from the operation of plants in the chemical industry, such as cellulose plants, sewage-treatment plants, nuclear power plants and similar plants, usually contain gaseous contaminants which, depending on their chemical composition, may be malodorous, unpleasant, noxious or toxic and thus injurious to the environment. Therefore they must be removed from the waste gases.

The gaseous contaminants produced in the industrial plants named are mainly sulfur- or halogen-containing compounds and, more particularly, $H_2S$, mercaptans, HCl, HBr, HI, certain sulfur and halogen organic compounds, chlorine, bromine and iodine.

One of the most widely used processes for the removal of contaminants of the types named from waste gases has been absorption.

Absorption processes suitable for the purification of waste gases are characterized in that they use wash liquids.

To deodorize waste gases with sulfur-containing contaminants, even minute traces of the latter must be removed since the threshold of odor is very low, particularly in the case of mercaptans. For ethyl mercaptan, for example, it is $1.6 \times 10^{-5} - 2 \times 10^{-3}$ ppm.

Similarly, even minute traces of iodine contained in the waste gases from nuclear power plants must be removed because of their radioactivity.

In the case of oxidizable contaminants, a method commonly employed to improve the efficiency of such absorption processes, and especially to remove traces, is the oxidative gas wash. (See Proposed VDI Guidelines, VDI 2443, 1977, Waste-Gas Purification Through Oxidizing Gas Wash.)

This method can be used both with readily volatile oxidizing agents such as chlorine, chlorine dioxide and ozone and with nonvolatile oxidants such as $H_2O_2$, sodium chlorite and potassium permanganate.

The use of readily volatile oxidizing agents does result in rapid oxidation of the contaminants dissolved in the wash liquid; however, this method has the drawback that when the amount of contaminants in the waste gas fluctuates, stoichiometric metering of these volatile substances is extremely difficult, excess oxidant thus being emitted, which instead of solving the waste-gas problem gives rise to an additional health hazard.

While the use of nonvolatile oxidizing agents largely eliminates the above problem, this method in turn has the disadvantage that the reactivity is often too low to permit rapid oxidation.

Another widely used variant of the absorption process is the alkaline wash, which can be employed also with contaminants such as chlorine, bromine and iodine. The drawback of this process is that $CO_2$ present in the effluent air is also washed out, which is undesirable.

A combination oxidation/alkaline wash process is described by H. Kurmeier in Gesundheits-Ing. 92 (1971), 6, 169–173.

SUMMARY OF THE INVENTION

The invention thus has as its object to provide an absorption process permitting even minute traces of gaseous halogen- or sulfur-containing compounds to be separated rapidly from waste gases without additional waste-gas or environmental problems being created thereby.

In accordance with the invention, this object is accomplished by conducting the gas stream containing the contaminants through a wash liquid which contains heavy-metal ions capable of forming difficultly soluble compounds with the particular contaminants to be removed.

From Biltz, Klemm and Fischer, Experimentelle Einführung in die Anorganische Chemie (Experimental Introduction to Inorganic Chemistry), Walter de Gruyter & Co., Berlin 1971; Ryland, L. B., and Tamele, M. W., Anal. Chem. of Sulfur and its Compounds, 1970, 1, 465–519, Wiley Interscience, New York; and Moore, H., and Helwig, H. L., Amer. Ind. Hygiene Assoc. J. 21 (1960), 466, it is known that certain heavy-metal ions are capable of forming with sulfur, chlorine, bromine and iodine difficultly soluble sulfides, chlorides, bromides and iodides.

However, since short gas retention times are desired, for reasons of plant size, in gas scrubbers used in waste-gas purification, absorption of the contaminants must occur rapidly. One skilled in the art therefore could not have foreseen that it might be possible to remove traces of gaseous contaminants almost completely from waste-gas streams, with formation of difficultly soluble metal compounds, under operating conditions still justifiable economically.

It is therefore surprising that it has proved possible, with the aid of the invention, to separate traces of contaminants in the ppm range almost completely with gas retention times of only 0.5 to 1 seconds or under 3 seconds, as in Example 6, hereinbelow.

Examples of heavy-metal ions capable of forming difficultly soluble salts with the contaminants named are silver, copper, cadmium, zinc and mercury. Preferred are copper and silver, and particularly preferred is silver because it is able to form difficultly soluble salts with all of the contaminants named.

In addition to the advantages mentioned above, the process in accordance with the invention offers the advantage over prior-art processes that the difficultly soluble heavy-metal compounds can be regenerated, thus permitting the possibly valuable heavy metal to be recovered. Regeneration may take place either directly in the washing operation or after separation (by filtration, for example) of the heavy-metal compound.

The wash need involve nothing more than conducting the waste gas to be purified through an aqueous solution of a soluble compound of the heavy metal. This may be done either countercurrently or concurrently.

A preferred soluble compound is $AgNO_3$, for example. Depending on how the scrubber is operated, the silver nitrate concentration should be between about $10^{-1}$ and $10^{-4}$ mol/liter.

A preferred embodiment of the process in accordance with the invention is an electrochemical separation process. Here the heavy-metal ions are formed by means of electrodes which are introduced into the wash solution and of which at least the anode consists of the appropriate heavy metal.

This process offers the added advantage that separation can be accelerated and that the metal ions can be introduced into the wash solution without the water being loaded with anions. In this way, pollution of the environment is further minimized in that the waste-gas problem is not suddenly compounded with a waste-water problem.

The concentration of the metal ions going into solution can be controlled by varying the current flowing between the electrodes. The electrode voltage so produced must not exceed the anodic oxygen overvoltage. The electrode surface area must be based on these criteria.

In the case of heavy-metal sulfides, the heavy-metal compounds may be reoxidized with oxidizing agents such as ozone. In this way, the heavy-metal consumption can be considerably reduced.

When ozone is used as oxidizing agent, the oxidation is best carried out by introducing the wash liquid into a second reactor to which an ozone-containing gas stream is then fed.

Oxidizing agents other than ozone are also suitable for use.

The invention is further illustrated in the accompanying drawing which is a graph plotting the removal of mercaptan against the volume of absorption liquid as pure water and silver nitrate solution. The mercaptan conversion obtained when pure water was used as washing medium is described by the lower curve, and that obtained when silver nitrate was added to the water (silver nitrate concentration $c_{wAgNO3}=10^{-4}$ mol/liter) is given by the upper curve. It is apparent that the addition of silver nitrate produces a decided improvement in conversion.

The results of a further test showed that a substantial further improvement of conversion can be achieved by increasing the $AgNO_3$ concentration.

The examples which follow will serve further to illustrate the invention.

EXAMPLE 1

A gas stream containing ethyl mercaptan (initial concentration, 20 ppm; gas throughput, 2 liters/minute) was conducted for 6 hours through a laboratory bubble column which contained an aqueous approximately 0.5-molar $AgNO_3$ solution (250 ml). A dark precipitate was formed. The aqueous solution remained clear during the test. At the gas outlet, no ethyl mercaptan could be detected by gas chromatography. (Conversion >99%.) This result was obtained also when $AgNO_3$ (equivalent to the mercaptan throughput) was continuously metered into the wash water.

EXAMPLE 2

The same procedure was followed as in Example 1, except that instead of $AgNO_3$ being added the $Ag^+$ ions were formed by introducing two silver grids into the solution. With an applied voltage of 2 V, the conversion obtained was about 50% while with 10 V (current I≈10 mA) it was no longer possible to detect mercaptan by gas chromatography. A black precipitate formed in the solution and at the cathode.

EXAMPLE 3

The procedure followed was the same as in Example 2, except that in place of $Ag^+$ ions $Cu^+$ ions were formed by introducing two copper grids. After the application of a voltage of about 10 V and with a measured current of about 11 mA, the mercaptan conversion was about 90%. A brown precipitate formed in the solution.

EXAMPLE 4

The procedure was the same as in Example 1, except that lower $AgNO_3$ concentrations ($<10^{-3}$ mol/liter) were used. The wash solution became turbid in the course of the test. After ozone was added to the wash solution, the turbidity disappeared. (Regeneration of wash liquid). No mercaptan could be detected by gas chromatography, either. (Conversion >99%.)

EXAMPLE 5

A gas stream containing traces of chlorine (less than 50 ppm; gas throughput about 0.5 liter/minute) was conducted for 2 hours through 100 ml of a neutral buffered sodium bromide solution containing 3 m NaBr, $10^{-3}$ m NaI, 0.1 m $NaH_2PO_4.1H_2O$, and 0.1 m $Na_2HPO_4.2H_2O$ (see Hersch and Deuringer, Analytical Chemistry 35, 7 (1963), p. 897) in which two electrodes had been immersed. The anode material was silver, the cathode material platinum, and the applied voltage 5 V.

The efficiency was determined semiquantitatively as follows: The chlorine-containing gas stream was first divided. One partial stream was conducted directly through a methyl orange solution, the other through the scrubber and then through a methyl orange solution. In the course of the test, the first methyl orange solution had to be changed 12 times because of decolorization (an indication of the presence of chlorine), whereas no color change was observable in the second solution.

EXAMPLE 6

For purification of a gas stream containing ethyl mercaptan, a packed column (diameter, 200 mm) with a packed volume of 16 liters (depth of packing $h_s=0.5$ m) was used. The wash liquid was recirculated and in a second reactor loaded with ozone. The initial mercaptan concentration was $c_{gema}=10$ ppm, and the concentration of the stripped ozone in the waste gas about $c_{gO3\omega}=1$ ppm. The average retention time of the gas was under 3 seconds.

It will be appreciated that the instant specification and examples are set forth by way of illustration and not limitation and that various changes and modifications may be made without departing from the spirit and scope of the present invention.

What is claimed is:

1. In the separation of traces of halogens and sulfur from a halogen- and/or sulfur-containing gas stream wherein the gas stream is contacted with a wash liquid to absorb the halogens and sulfur, the improvement which comprises using a gas stream containing as contaminant at least one of a mercaptan, $H_2S$, HCl, HBr, HI, chlorine, bromine and iodine, and introducing into the wash liquid a pair of electrodes, the anode consisting of a heavy metal which as cation is capable of forming difficultly soluble halides or sulfides with the contaminants that are present.

2. A process according to claim 1, wherein the heavy metal anode is silver or copper.

3. A process according to claim 1, wherein the gas stream is continuously supplied to the wash liquid.

4. A process according to claim 1, wherein the gas stream contains sulfur and the wash liquid is contacted with ozone thereby to react with the heavy metal sulfides.

5. A process according to claim 1, wherein the wash liquid comprises water.

6. A process according to claim 1, wherein the gas stream contains halogen and the wash liquid comprises a neutral buffered solution of sodium bromide.

7. A process according to claim 1, wherein the heavy metal halide and/or sulfide is removed from the wash liquid, and the wash liquid is recirculated for further absorption.

8. A process according to claim 1, wherein the contact time between the gas stream and wash liquid is at most about 3 seconds.

9. A process according to claim 1, wherein the wash liquid is aqueous and the gas stream is continuously supplied thereto, the contact time between the gas stream and wash liquid is at most about 3 seconds, the silver or copper halide and/or sulfide is removed from the wash liquid, and the wash liquid is recirculated for further absorption.

10. In the separation of traces of sulfur from a sulfur-containing gas stream is contacted with a wash liquid to absorb the sulfur, the improvement which comprises using a gas stream containing as contaminant at least one of a mercaptan and $H_2S$, including in the wash liquid heavy metal ions capable of forming difficultly soluble sulfides with the contaminants that are present, and contacting the wash liquid with ozone thereby to react with the heavy metal sulfides.

11. A process according to claim 10, wherein the gas stream is continuously supplied to the wash liquid.

12. A process according to claim 10, wherein the heavy metal ions are introduced into the wash liquid by immersing in the liquid a pair of electrodes, the anode of which comprises the heavy metal, and passing an electric current through the solution.

13. A process according to claim 10, wherein the heavy metal anode is silver or copper.

14. A process according to claim 10, wherein the wash liquid comprises water.

15. A process according to claim 10, wherein the heavy metal sulfide is removed from the wash liquid, and the wash liquid is recirculated for further absorption.

16. A process according to claim 10, wherein the contact time between the gas stream and wash liquid is at most about 3 seconds.

17. A process according to claim 10, wherein the wash liquid is aqueous and ions of silver or copper are continuously supplied thereto along with the gas stream, the contact time between the gas stream and wash liquid is at most about 3 seconds, the silver or copper sulfide is removed from the wash liquid, and the wash liquid is recirculated for further absorption.

* * * * *